Oct. 30, 1934.　　　　　E. D. EBY　　　　1,979,148
JOINT FOR ELECTRIC CABLES
Filed Jan. 19, 1932
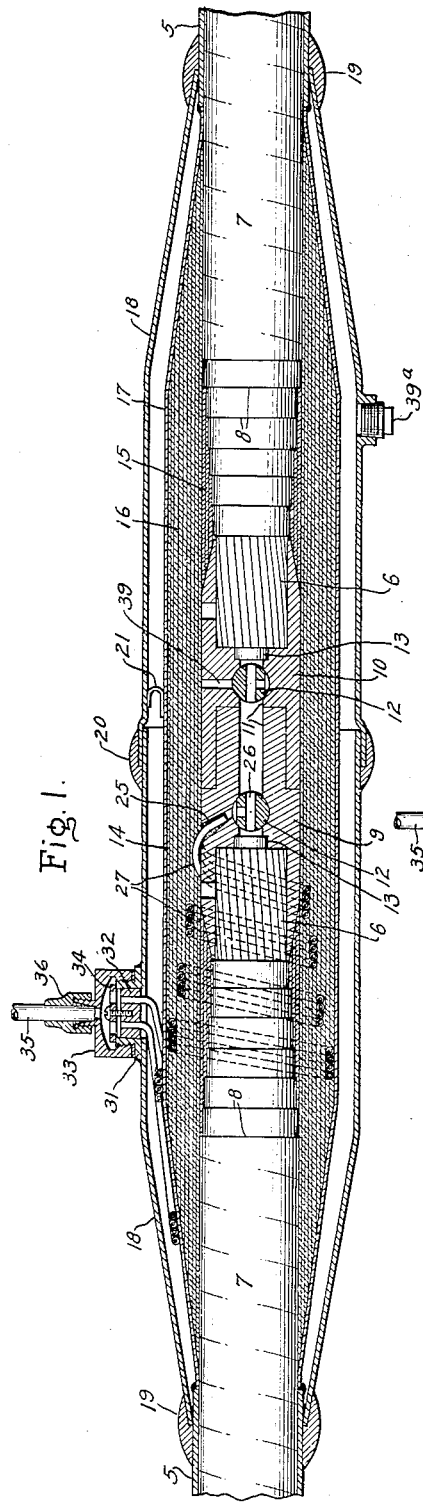
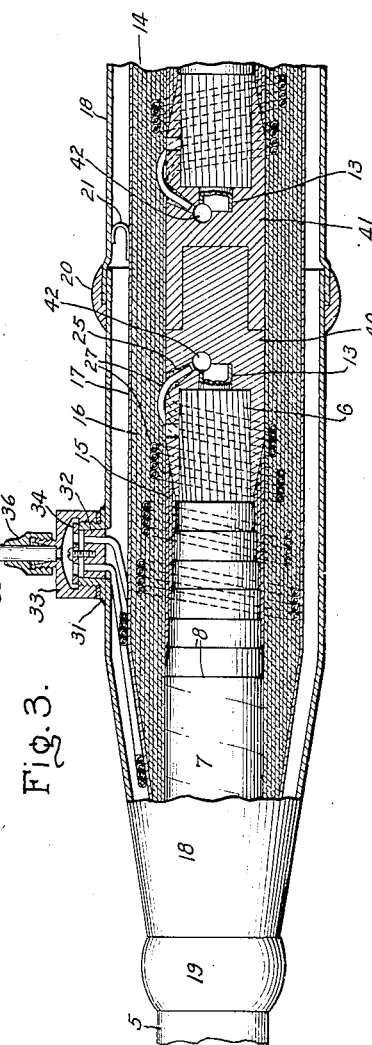
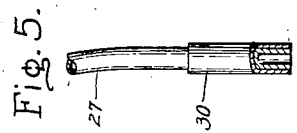
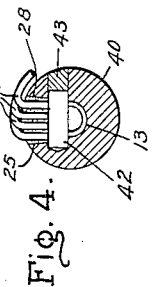
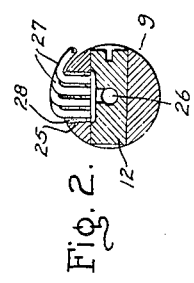
Inventor
Eugene D. Eby,
by Charles E. Mullen
His Attorney.

Patented Oct. 30, 1934

1,979,148

UNITED STATES PATENT OFFICE 1,979,148

JOINT FOR ELECTRIC CABLES

Eugene D. Eby, Pittsfield, Mass., assignor to General Electric Company, a corporation of New York Application January 19, 1932, Serial No. 587,474

15 Claims. (Cl. 173—268)

The present invention relates to cables for transmitting electric currents for power purposes at high potentials. Such cables comprise a hollow conductor surrounded by a body of insulation and an enclosing metal sheath. Located within the channel of the hollow conductor is a body of insulating fluid, of which thin oil is an illustration. Because the fluid expands and contracts with changes of temperature, the established practice is to provide variable capacity reservoirs at spaced intervals along the length of the cable and connect them to the channel within the conductor. Because of electrical considerations occasioned by the high potential, it has been the practice to make the connections between the reservoirs and the channel only through the medium of fluid stop joints. Such joints as their name implies are used to electrically connect one cable section or length with another and at the same time prevent the fluid in one section or length from entering the connected section on the other side of the joint. These joints by reason of their necessarily complex structure are expensive and are required wherever it is necessary to limit the hydrostatic pressure on a given part of the cable due to the irregular profile of the ground over which the cable is laid. On the other hand, there are many places where a stop joint as such is unnecessary but where it is necessary to connect a reservoir to the cable. The ordinary or so called normal joints used to connect cable lengths and permit fluid to flow between them while substantially cheaper than stop joints do not permit of connecting a cable channel to a reservoir. In this connection I may say that the very high voltages transmitted by such cables is the primary reason why normal joints as heretofore made are unsuited for the purpose.

My invention has for its object the provision of an improved simple form of joint which is less expensive and simpler than the stop joints and only slightly more expensive than the normal joints for feeding fluid to the cable with the ultimate result that the total cost of a cable system may be appreciably reduced. To state the matter in another way, with my improved construction stop joints need only be employed where necessary to break up the static head of the fluid instead of using them at every place along the cable length where it is required that a reservoir shall be connected.

For a consideration of what I believe to be novel and my invention, attention is directed to the accompanying description and the claims appended thereto.

In the drawing Fig. 1 illustrates in longitudinal section a joint embodying my invention; Fig. 2 is a cross-section through the connector at the center of the joint; Fig. 3 illustrates my invention as applied to a fluid stop joint whereby its construction may be simplified; Fig. 4 is a cross-section through the connector at the center of the joint, and Fig. 5 is a detail view of a ferrule for a feeding tube.

In the drawing 5 indicates the lead or equivalent sheaths of two cable lengths which are to be connected electrically. 6 indicates the hollow stranded conductors, the hollow space in the center forming a channel for the fluid insulation, and 7 the layers of factory applied insulation, such as paper. The insulation is decreased in thickness toward the connector by a series of steps 8. 9 and 10 indicate members of a two part metal connector, each having a central bore 11 through which insulating fluid such as oil is free to flow from the channel of one length of cable to the other. Each half connector is provided with a two-way plug valve 12 which is used for flushing purposes in installing the cable in the underground ducts. In the position shown they are open to permit fluid to flow from one cable channel to the other. When the valves are turned through an angle of 90 degrees the flow is shut off. Each half connector has a socket in which the ends of the stranded conductors are located and soldered. In the outer wall of the socket is a small hole through which solder may be introduced for making positive contact between cable conductor and connector. Inside of each conductor and forming a continuation of the hollow core or channel thereof is a short tube 13 which supports the conductor strands at the connector.

Completely enclosing the connector and the adjacent ends of the insulated conductors is a body of insulation 14 of any suitable material of the proper shape, diameter and length. As an illustration, but not as a limitation, the body may be composed of varnished cambric tape having high insulating, low loss properties and applied layer by layer until the desired amount has been thus applied. In taping, that portion between the ends of the connector and the various steps in the factory applied insulation, is first applied as indicated by the numeral 15. As a result of this the cable presents a smooth cylindrical surface from one end to the other. After this is done the outer part 16 of the taping may be smoothly and evenly applied. Enclosing the body of insulation is a ground shield 17, the ends of which are soldered to the cable sheaths 5. The shield may for example be made of copper tape or perforated metal ribbon. Enclosing the parts of the joint is a two-part metallic sleeve or casing 18, the ends of which are soldered to the sheaths by wiped soldered joints 19. The parts of the casing are similarly united by a joint 20. The casing and ground shield 17 are connected at or near the center by a contact member 21.

Considering now the means for getting fluid into and out of the channel of the cable, the highest electrical stress on the joint insulation or dielectric material is in the region of the connector and decreases toward the periphery of the insulating body, hence it is particularly important that there shall be no voids or space in said region. It is also of the greatest importance that there be no opportunity for leakage current to pass from the connector axially along the insulation to the cable sheath between the factory insulation and the tape wrapping and also between the layers of said wrapping. It is to be borne in mind that suitably impregnated insulation is a substantially better insulation than oil hence it becomes important to make the oil or fluid carrying conduit leading to the outside comparatively long and of small cross-section. These important and necessary results are obtained by the following means: The left-hand connector part is provided with an opening 25 or a series of openings in its upper side which communicates with a port 26 in the plug valve 12. Extending into the openings or recesses are small conduits or unitary tubes 27 of which four are shown, but the number may be greater or less. In order to avoid sharp bends in the tubes the recesses 25 are slanted in the direction the tubes finally occupy. The tubes are anchored in the recesses by a filling of suitable cement 28. The tubes should be made of high grade insulation, be reasonably flexible and not adversely affected by the oil in the cable. For this purpose the conduits or tubes may be made of an alkyd resin or equivalent material. Alkyd resins include all those complexes resulting primarily from the interaction of a polyhydric alcohol, such as glycerine, with a polybasic acid, such as phthalic acid or its anhydride, with or without other reacting ingredients. In order that the oil in the tubes shall not be unduly stressed electrically they are purposely made long and of small diameter bore. They are coiled or wound around the cable and to obtain the necessary length, and are also provided with a certain amount of "slack" to permit the left-hand casing part to be slipped back over the cable while the jointing operation is carried out. For the purpose of illustrating my invention, it is shown in connection with a 69 kv cable, but its use is not limited thereto. As further illustrating my invention, the unitary conduits or tubes may have an inside diameter of one-eighth of an inch and a length of six feet which latter is many times the length of one-half of the joint. Of the total length a part is embedded in the body of wrapped insulation or reinforcement and the remainder forms the "slack" which is loosely wrapped around the electrostatic shield which covers the reinforcement or insulating body. The shield is cut away sufficiently to permit the tubes to pass through it without injury thereto.

As previously stated the insulation is most highly stressed near the conductor. To reduce the stress on the oil within the unitary tubes as rapidly as possible the turns of the tubes or conduits instead of being of the same diameter and occupying the same cylindrical surface, are so arranged that each successive turn or wrap is of larger diameter than the preceding one until the periphery of the body or joint insulation is reached. In order to reduce the danger of faulty insulation, the turns also progress or have a pitch like a screw thread from the inner end to the outer surface of the insulating body as distinguished from being coiled one around the other in the same perpendicular plane. By thus arranging the tubes in an open helix or spiral of ever increasing diameter, it becomes a relatively simple matter to so wind the tape comprising the insulating body that no spaces or voids are formed around each turn of the tubes except those occasioned by the fact that the surfaces presented by the tubes are round. These spaces which are very small may be filled as the winding of the insulation and tubes proceeds, as for example, by a non-absorbent insulating material or by a heavy brushing compound which is not adversely affected by oil. By arranging the turns of the tubes in the manner described, it will be seen that whereas a part of the first turn is in contact with the connector where the electrical stress is the highest a succeeding portion is removed therefrom with tape insulating between, and that the other turns increasing in diameter as they do rapidly move out of the zone of highest stress to that outside of the electrostatic or ground shield 17.

To facilitate the work of connecting the tubes to the connector 9 and to a header or fitting carried by the casing arranged to receive their outer ends, both ends of each tube are provided with metal ferrules, of which one is shown at 30 in Fig. 5 and which has a very slight taper corresponding to that of the reamer used in reaming the receiving holes both in the connector and header. The tubes are secured in the ferrules by means of "Glyptal" varnish or its equivalent.

In order to establish communication with the tubes from the outside, a header is provided and supported by that half of the joint casing which immediately surrounds the tubes. It comprises a member 31 that is soldered to the casing and is provided with a central plug 32 and an external screw thread to receive the cap 33. The plug has as many openings as there are tubes and in these openings are secured the metal ferrules 30 on the tube ends. The plug is held in position by a perforated plate 34 which rests on the upper edge of the member 31, the plate and plug being connected by a small screw. The cap has an opening to receive the pipe 35 leading to a reservoir of any suitable construction, for example, that shown in my patent No. 1,823,731, dated September 15, 1931. The pipe is secured in place by a suitable screw threaded nut 36 and tapered cone which form a fluid-tight connection.

At installation the parts of the connector are soldered to the cable ends and then flushed to free them of foreign matter in the usual way, subsequent to which operation the insulation is applied.

Brief reference has been made to applying the reinforcement or insulating body and the tubes. After the taping 15 has been wound over the stepped part of the factory applied insulation and the connector, the ferrules on the inner ends of the tubes are forced into the connector and properly sealed. Tape insulation or reinforcement is then applied to form a covering of substantially conical form, increasing in diameter from right to left from the connector to form seats for the turns of the tubes, as indicated in Fig. 1. Over these seats are wrapped the tubes after which the remainder of the reinforcement or insulating body is applied and later the ground shield. As a result of the winding operation, the tubes and layers of insulation are interspaced. During the wrapping operation the outer ends of the tubes are temporarily wrapped around the cable, and they may or may not be provided with ferrules at the time. After the outer ends of the tubes are secured in the plug 32, the latter is seated in place and retained by the perforated plate 34 and screw. After the tubes have been flushed of foreign matter, their outer ends are temporarily sealed independently or at the header to prevent loss of fluid and also to facilitate the taping operation. After the joint is fully insulated and shielded, the parts of the casing are moved to the position shown and soldered to each other and to the cable sheaths. Later the pipe 35 is connected and also the reservoir.

After the connector members are sweated or soldered to the cable ends and to each other and the ferrules on the inner ends of the tubes secured to a connector part, the plug valves 12 are opened and the reservoir on the opposite end of the cable length is caused to slowly feed fluid into the cable, the effect of which is to insure a slow flow of fluid through the tubes and prevent the admission of air or other foreign matters to the tubes and cable channel. Although the right-hand plug valve is not associated with a set of feeding tubes, it is provided with a port 39 for flushing purposes. Before the casing is finally sealed it is preferable to evacuate it and then fill it with degasified oil. For this purpose the screw threaded plug 39ª may be used, the practice in this respect being that normally employed.

It is desirable to connect the inner ends of the tubes to the connector and the outer ends to the header rather than to terminate the tubes at the surface of the body of insulation as this affords a better control of the movements of the fluid between reservoir and cable. The arrangement is also desirable in the event of a cable failure as there will be less tendency to loss of fluid and deterioration of the insulation. However, in the broader aspects of my invention, the tubes may terminate in other ways. Also the tubes instead of being round may be otherwise shaped, provided they are of such a character as not to be crushed when the tapered body of insulation is applied.

My invention thus far has been described as a modified form of "normal joint", but it is also applicable to and substantially simplifies the construction and cost of joints of the semi-stop type as illustrated in Figs. 3 and 4. In these figures the connector parts 40 and 41 instead of being hollow to afford a passage for fluid are solid. At the point where the inner tube 13 enters the member 40 it is drilled crosswise as indicated at 42, Fig. 4, and the outer end of the hole is filled with a screw plug 43 which may be soldered in place prior to completion of the joint. The holes or recess for receiving the ferrules on the inner ends of the tubes are inclined as before and for the same reason. The ferrules are likewise secured in place in the same manner. The method of applying the body of insulation and embedding the parallel tubes therein is the same as that previously described and need not be repeated. Because the connector in this instance is so constructed as to prevent the flow of fluid from the channel of one conductor to that of the other, a duplicate set of feeding tubes is connected to the second half of the connector, and both sets of tubes are conveyed to the outside of the casing by means of headers as previously described. In some cases it may be desirable to connect only one member of a connector to a set of feeding tubes and to rely upon another joint at some other part of the cable length or section to take care of the demands of the cable as the fluid alternately heats and cools.

My invention has been described in connection with joints having electrostatic shields but it is also useful in connection with non-shielded joints when the necessity of feeding oil to the cable exists.

What I claim as new and desire to secure by Letters Patent of the United States is:

1. A joint for fluid filled cables comprising hollow insulated conductors, a connector for uniting adjacent ends of the conductors having a fluid containing channel therein, fluid insulation filling the conductors and connector, a body of insulation enclosing the connector and adjacent insulated ends of the conductors and comprising tape arranged in concentric layers, an enclosing casing for the joint which is sealed at its ends to the cables, and a fluid conveying conduit made of a unitary piece of tubing arranged in spiral form, the individual turns of which are embedded between the successive layers of the body of insulation, the inner end of the tubing opening into a channel within the connector and the outer end terminating in a wall of the casing.

2. A joint for fluid filled cables comprising hollow insulated conductors, a connector for uniting adjacent ends of the conductors having a fluid containing channel therein, fluid insulation filling the conductors and connector, a body of insulation enclosing the connector and adjacent insulated ends of the conductors and comprising concentric layers of tape, an enclosing casing for the joint which is sealed at its ends to the cables, and a fluid carrying unitary conduit made of non-conducting material spirally wrapped about an end of a conductor within the body of insulation, the turns of the spiral being interspaced between layers of tape and displaced laterally one from another and increasing in diameter outwardly from the axis of the conductor, the inner end of the conduit opening into the channel in the connector and terminating at the other end at a point outside of said body.

3. A joint for fluid filled cables comprising hollow insulated conductors, a connector for uniting adjacent ends of the conductors having a fluid containing channel therein, fluid insulation filling the conductors and connector, a body of insulation enclosing the connector and adjacent insulated ends of the conductors and comprising concentric layers of tape, an enclosing casing for the joint which is sealed at its ends to the cables, and a tube made of non-conducting material spirally wrapped about an end of a conductor with the turns thereof located between layers of tape at progressively different distances from the axis thereof, one end of the tube entering the connector and its other end terminating outside of the body where the electrical stress on the body is low.

4. A joint for fluid filled cables comprising hollow insulated conductors, a connector for uniting adjacent ends of the conductors having a fluid containing channel therein, fluid insulation filling the conductors and connector, a body of insulation enclosing the connector and adjacent insulated ends of the conductors and comprising concentric layers of tape, an enclosing casing for the joint which is sealed at its ends to the cables, and a flexible insulating unitary tube of small diameter and of a length greater than that of one half of the joint, the tube being embedded between layers of tape forming the body and extending through it from the connector where the electrical stress is at a maximum to a point in its outer surface where the stress is at a minimum, said tube conveying fluid to and from the channel in the cable.

5. A joint for fluid filled cables comprising insulated conductors each having a channel containing fluid insulation, a connector uniting adjacent cable ends, a body of insulation covering the connector and parts of the conductor insulations, said body comprising tape wrappings arranged in layers, an enclosing fluid tight casing for the joint, and parallel unitary tubes of insulating material of small diameter and relatively great length compared to the axial length of the portion of the joint occupied thereby and embedded between said layers for conveying fluid through the wall of the casing into the connector and the channel of a conductor.

6. A joint for fluid filled cables comprising insulated conductors each having a channel containing fluid insulation, a connector electrically uniting adjacent cable ends, said connector having a bore and a lateral recess both communicating with the channel of a conductor and filled with fluid insulation, a body of insulation enclosing the connector and insulated ends of the conductors comprising concentric layers of material, a casing for the joint, a flexible unitary tube of insulating material wound around the body and embedded therein, the inner end of the tube being located in the recess in the connector and the outer end extending through the periphery of the body and terminating at the casing wall, and a means carried by the casing in which the outer end of the tube is seated.

7. A joint for fluid filled cables comprising insulated conductors, each having a fluid containing channel, a connector electrically uniting adjacent conductor ends having a fluid receiving bore communicating with a channel, a body of insulation enclosing the connector and adjacent ends of the conductors, a fluid tight casing for the joint, small parallel unitary tubes of insulation embedded within the body and wound to form an open spiral, the diameters of the turns of the spiral increasing from the connector outwardly to remove the outer ends from the region of highest electrical stress, the inner ends of the tubes communicating through the connector with a cable channel, and means carried by a wall of the casing to receive the outer ends of the tubes.

8. A joint for fluid filled cables comprising insulated conductors, each having a fluid containing channel, a connector electrically uniting adjacent conductor ends having a fluid receiving bore communicating with a channel, a body of insulation comprising concentric layers of material enclosing the connector and adjacent ends of the conductors, a fluid tight casing for the joint, and a flexible unitary tube of insulating material of small diameter and relatively great length spirally wrapped about a conductor to convey fluid between the channel and the outside of the casing, one part of the tube being embedded within the body between layers thereof and the remainder loosely overlying the body to permit a part of the casing to be moved over the joint after the body and tube are assembled in place.

9. A joint for fluid filled cables comprising insulated conductors, each having a fluid containing channel, a connector for electrically connecting adjacent conductor ends also containing fluid, a fluid tight casing for the joint, a body of insulation for the connector and cable ends, and small flexible tubes of insulating material for conveying fluid from a conductor channel to the outside of the casing, said insulation and tubes being wrapped around an end of a conductor in layers, the tubes forming a spiral of gradually enlarging diameter with the turns thereof interspaced with layers of said body and extending from a cable channel to the periphery of the body.

10. A joint for fluid filled cables comprising insulated conductors, each having a fluid filled channel, a connector electrically uniting adjacent conductor ends and having a bore to permit passage of fluid, a two part casing for and in spaced relation to the joint, the plane of division being perpendicular to the axis of the joint, a header carried by a wall of one part of the casing, a body of insulation enclosing the connector and adjacent conductor ends, and flexible insulating unitary tubes arranged in parallel in the form of an open spiral and embedded at spaced intervals in the body for a portion of their length, the remainder being movable in the space between the body and the inner wall of the casing to permit movements of a part of the casing with respect to the joint, the inner ends of the tubes communicating with a conductor channel and their outer ends terminating in the header.

11. A cable joint comprising insulated conductors, each containing a channel filled with fluid insulation, a connector electrically uniting adjacent conductor ends and preventing the flow of fluid from one channel to another, a body of insulation enclosing the connector and adjacent insulated ends of the conductors and comprising concentric layers of material, a fluid tight casing for the joint, and a spirally arranged unitary tube of insulating material embedded in said body between layers thereof and connected at its inner end to one of the channels and communicating at its outer end with the outside of the casing.

12. A cable joint comprising insulated conductors, each containing a channel filled with fluid insulation, a connector electrically uniting adjacent conductor ends and preventing the flow of fluid from one channel to another, a body of insulation enclosing the connector and adjacent insulated ends of the conductors and comprising concentric layers of material, a fluid tight casing for the joint, and two sets of spirally arranged unitary tubes of insulating material both embedded in said body between layers thereof and connected at their inner ends to different cable channels and communicating at their outer ends to different regions outside of the casing.

13. A cable joint comprising insulated conductors, each containing a channel filled with fluid insulation, a connector for electrically uniting adjacent conductor ends, a body of insulation enclosing the connector and adjacent insulated ends of the conductors, a fluid tight casing for the joint, a spirally arranged tube of insulation embedded in the body, and metal ferrules on the ends of tube, one of said ferrules being seated in the connector in communication with a conductor channel, and the other of said ferrules being seated in the joint casing and opening to the outside thereof.

14. A joint for fluid filled cables comprising insulated conductors, each having a channel filled with insulating fluid and a metal sheath, a hollow connector for electrically uniting the cable ends, two-way shut-off valves definitely positioned in the connector, a body of insulation enclosing the connector and adjacent insulated ends of the conductors, an enclosing metal casing sealed to the sheaths, a ground shield overlying the said body and connected at its ends to the sheaths, a spirally arranged conduit within said body having its inner end secured in the connector at the side of the valve permitting control of fluid from the channel to the conduit, and its outer end extending through the ground shield, and a header carried by the casing in which the outer end of the conduit is seated.

15. A cable joint comprising insulated conductors, each containing a central channel filled with fluid insulation, a two-part connector for uniting the conductors and containing a channel for establishing communication between those in the conductors, insulation enclosing the connector and conductor ends, an enclosing casing, a conduit of insulating material forming a spiral and located principally within the insulation and communicating at one end with the channel in the connector and the other end terminating outside of the insulation, and a valve located in the connector for controlling the passage of fluid through it from one conductor channel to the other and also the passage of fluid through the said conduit.

EUGENE D. EBY.